United States Patent

Erben et al.

[15] 3,681,687

[45] Aug. 1, 1972

[54] SUPERCONDUCTOR DEVICE FOR USE IN MOVING BODIES FOR NAVIGATION PURPOSES TO DETERMINE THE CHANGE IN ORIENTATION THEREOF USING THE SAGNAC EFFECT

[72] Inventors: Klaus Dieter Erben; Walter Kroy, both of Munich; Walter E. Mehnert, Ottobrunn, all of Germany

[73] Assignee: Messerschmitt-Bolkow-Blohm GmbH, Munchen, Germany

[22] Filed: Feb. 9, 1970

[21] Appl. No.: 9,485

[30] Foreign Application Priority Data

Feb. 17, 1969 Germany.............P 19 07 857.6

[52] U.S. Cl............324/71 R, 324/83 A, 235/156.25

[51] Int. Cl............................................G01h 27/00

[58] Field of Search...........324/34 C, 43, 71 R, 83 A; 207/306; 235/150.25; 356/106

[56] References Cited

UNITED STATES PATENTS 3,395,270 7/1968 Speller..........................356/106

*Primary Examiner*—Rudolph V. Rolinec
*Assistant Examiner*—R. J. Corcoran
*Attorney*—Woodhams, Blanchard & Flynn

[57] ABSTRACT

Device for generating electric pulses on superconductor loops particularly for instrumentation to determine the position and change of position of aircraft and spacecraft. An adapter preferably of Type I superconductor is installed in a superconductor loop, preferably of Type II superconductor, the ends of the adapter having insulating layers and carrying signal input layers and carrying signal input layers on one side thereof and current collecting layers on the other side thereof. A signal transmitter controls both the signal input layers and the current collecting layers and an auxiliary coil is provided for producing normal conductivity within an intermediate range.

5 Claims, 2 Drawing Figures

PATENTED AUG 1 1972 3,681,687

INVENTORS
KLAUS DIETER ERBEN
WALTER KROY
WALTER ERICH MEHNERT
BY
Woodhams, Blanchard & Flynn
ATTORNEYS

A SUPERCONDUCTOR DEVICE FOR USE IN MOVING BODIES FOR NAVIGATION PURPOSES TO DETERMINE THE CHANGE IN ORIENTATION THEREOF USING THE SAGNAC EFFECT

CROSS REFERENCE TO A RELATED APPLICATION

This application contains subject matter related to our copending application Ser. No. 9 484, filed Feb. 9, 1970.

The invention relates to a device for generating electrical pulses on superconductor loops, preferably for measuring devices for navigation purposes in air and spacecraft, the position and change of position being determined by use of the Sagnac effect.

So far, such devices for the purposes mentioned have not been disclosed.

The object of the present invention is to permit generation of electric or electromagnetic pulses on a superconductor loop and thus be able to perform timing of electric pulses which are propagated on a superconductor at approximately the velocity of the light. The invention meets this object by having in a superconductor loop, preferably of Type II, an adapter, preferably of Type I superconductor whose ends are provided with insulation layers and carry signal input layers and current which are controlled by a signal transmitter, current collecting layers and an auxiliary coil for producing normal conductivity within an intermediate range.

Furthermore, it is suggested that the adapter consist of a vapor deposited lead or tin layer, e.g., on quartz, in which the ends of the superconductor loop are vapor deposited and on which the signal input layers and the current collecting layers on the adapter are also deposited, isolated from the adapter by vapor deposited insulating layers.

In addition, the invention provides that the signal transmitter also supplies the control pulses for the magnetic field $H_5$ of the auxiliary coil and that the current collecting layers are connected with a measuring device.

The invention is described and drawn. The figures show:

Figure 1:
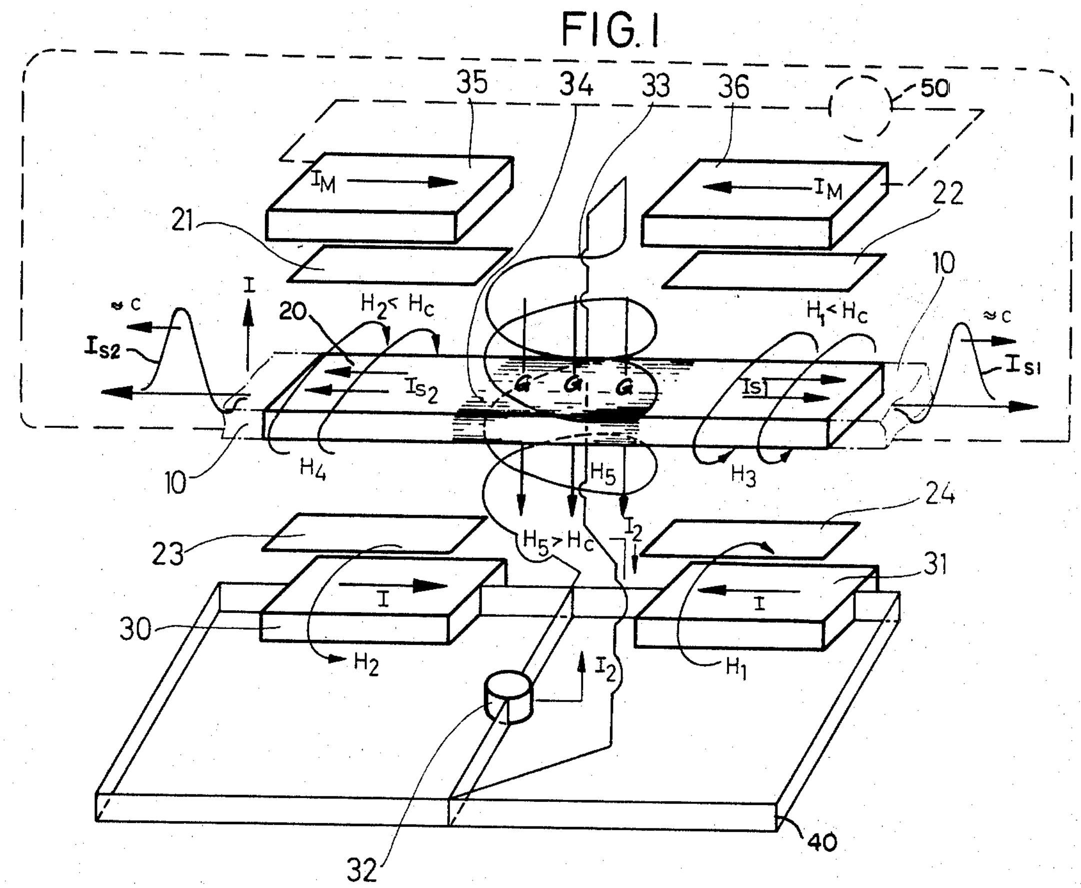
FIG. 1 is an exploded schematic diagram of an embodiment of the invention.
Figure 2:
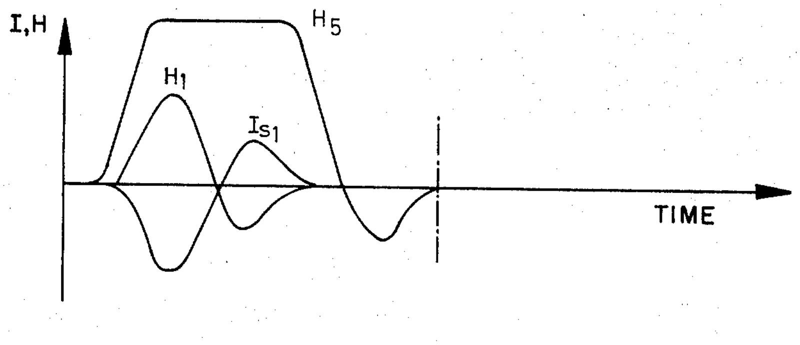
FIG. 2 is a time diagram of a pulse input process.

For the device according to the invention, the ends of a superconductor loop 10 connect to an adaptor 20, e.g., a vapor deposited lead or tin layer on quartz is suitable, in which the ends of the superconductor loop 10 (a segment of which is illustrated in FIG. 1) are deposited, thus producing the electrical contact. For producing signals, two signal input layers 30, 31 parallel with the adapter are deposited on the adapter 20. The signal input layers 30, 31 are isolated by the insulating layers 23, 24 and are connected through an electrical connection 40 with a signal transmitter 32. This signal transmitter 32 produces a current pulse I in the signal input layers 30, 31, which may also consist of a Type I or II superconductor. This current I produces the magnetic fields $H_1$ and $H_2$. These in turn produce the supercurrents $I_{s1}$ and $I_{s2}$ which generates the magnetic fields $H_3$ and $H_4$ respectively so that the resulting magnetic field disappears at the surface within the London depth of penetration. In this process, the requirement must be met that $H_1$ and $H_2$ be smaller than the critical field $H_c$ of the Type I superconductor adapter 20 or, when a Type II or III superconductor adapter 20 is used, $H_1$ and $H_2$ be advantageously smaller than $H_{c1}$. In order to avoid interference of the two supercurrents $I_{s1}$ and $I_{s2}$, an auxiliary coil 33 produces, in a range of the adapter 20, a magnetic field $H_5$, which is larger than the $H_c$ when a Type I superconductor is used, or larger than the $H_c$ when a Type II or III superconductor is used. Type III superconductors are those producing the "Pinning effect."

Thus field $H_5$ produces normal conductivity in the intermediate range 34 and prevents interference of the current pulses which are now propagated along the superconductor as shown in FIG. 1. When the current pulses $I_{s1}$ and $I_{s2}$ are at a sufficient distance from the adapter 20, the magnetic field $H_5$ is switched off to allow current pulses $I_{s1}$ and $I_{s2}$ to pass through the current collecting or measuring segment after having passed through the superconductor 10. The signal transmitter 32 also provides the control pulses for the magnetic field $H_5$. For measuring the arrival of the current pulses in the so-called measuring segment, which is at the same time the signal input segment, two current collecting sections 35, 36 are vapor deposited on the adapter 20, isolated by insulating layers 21, 22. In these current collecting sections, the current pulses $I_{s1}$ and $I_{s2}$ produce when passing through the current collecting measuring segment, a current pulse $I_m$ whose shape and amplitude are measured via a measuring device 50. By this measurement, using Sagnac measurements, a statement is provided on the time shift or the phase shift of the current pulses $I_{s1}$ and $I_{s2}$. The current collecting sections 35, 36 are also preferably made of Type I superconductors.

The embodiments of the invention in which an exclusive property or privilege is claimed are defined as follows:

1. A device for moving bodies for navigation purposes, particularly in aircraft and spacecraft, to determine the change in orientation thereof, comprising:
   - electrical pulse generator means for generating pulses;
   - superconductor means connected in electrical circuit with said electrical pulse generator means for generating pulsed magnetic fields in response to said pulses;
   - superconductor loop means having opposite end segments;
   - adapter means connected in electrical circuit with said superconductor loop means and magnetically coupled to said superconductor means so as to receive the pulsed magnetic fields and for transmitting current pulses in response thereto to said opposite end segments of said superconductor loop means to effect a propagation of a current signal in opposite directions along said superconductor loop means; and
   - signal collecting means for detecting said propagated signals after said signals have passed through said superconductor loop means and provide signal means for measurement, via the Sagnac effect, to determine the shift or phase shift of said propagated signals.

2. A device according to claim 1, wherein said adapter means includes first insulative means between said superconductor means and said superconductor loop means and second insulative means between said superconductor loop means and said signal collecting means.

3. A device according to claim 1, including interference preventing means responsive to said electrical pulse generator means for preventing an interference of said propagated signals during the interval of time that said adapter means is effecting an application of said current signal to said superconductor loop means.

4. A device according to claim 3, wherein the interference preventing means comprises a coil connected in magnetic association with said adaptor means between said opposite end segments of said superconductor loop.

5. A device according to claim 1, wherein said adapter means includes lead or tin layers vapor deposited on quartz; and wherein said opposite end segments of said superconductor loop means are vapor deposited on said lead or tin layers and said layers are insulated from said superconductor means.

* * * * *